US012770865B2

(12) United States Patent
Kim et al.

(10) Patent No.: US 12,770,865 B2
(45) Date of Patent: Oct. 20, 2026

(54) ANODE FOR SECONDARY BATTERY AND LITHIUM SECONDARY BATTERY INCLUDING THE SAME

(71) Applicant: SK On Co., Ltd., Seoul (KR)

(72) Inventors: Hyo Mi Kim, Daejeon (KR); So Hyun Park, Daejeon (KR); Sang Baek Ryu, Daejeon (KR); Hwan Ho Jang, Daejeon (KR); Jun Hee Han, Daejeon (KR); Moon Sung Kim, Daejeon (KR); Da Hye Park, Daejeon (KR); Sang In Bang, Daejeon (KR); Seung Hyun Yook, Daejeon (KR); Da Bin Chung, Daejeon (KR)

(73) Assignee: SK ON CO., LTD., Seoul (KR)

( * ) Notice: Subject to any disclaimer, the term of this patent is extended or adjusted under 35 U.S.C. 154(b) by 663 days.

(21) Appl. No.: 18/337,428

(22) Filed: Jun. 20, 2023

(65) Prior Publication Data

US 2024/0063373 A1 Feb. 22, 2024

(30) Foreign Application Priority Data

Aug. 17, 2022 (KR) ........................ 10-2022-0102486

(51) Int. Cl.

*H01M 4/36* (2006.01)
*H01M 4/02* (2006.01)
*H01M 4/133* (2010.01)
*H01M 4/134* (2010.01)

(Continued)

(52) U.S. Cl.

CPC ........... *H01M 4/366* (2013.01); *H01M 4/133* (2013.01); *H01M 4/134* (2013.01); *H01M 4/386* (2013.01);

(Continued)

(58) Field of Classification Search

CPC ...... H01M 4/366; H01M 4/133; H01M 4/134; H01M 4/386; H01M 4/587;

(Continued)

(56) References Cited

U.S. PATENT DOCUMENTS

2019/0305308 A1 10/2019 Lee et al.
2020/0194796 A1 6/2020 Sun (Continued)

FOREIGN PATENT DOCUMENTS

CN 111628141 A 9/2020
CN 113097427 A 7/2021

(Continued)

OTHER PUBLICATIONS

Extended European Search Report for the European Patent Application No. 23181561.4 issued by the European Patent Office on Jan. 31, 2024.

*Primary Examiner* — Stewart A Fraser
(74) *Attorney, Agent, or Firm* — IP&T GROUP LLP

(57) ABSTRACT

An anode for a secondary battery is disclosed. In some implementations, the anode includes a current collector, a first anode mixture layer formed on at least one surface of the current collector, and a second anode mixture layer formed on the first anode mixture layer. The first anode mixture layer and the second anode mixture layer include a silicon-based active material, respectively. The first anode mixture layer includes a first carbon-based active material. The second anode mixture layer includes a second carbon-based active material. The first carbon-based active material has an OI value greater than or equal to an OI value of the second carbon-based active material.

14 Claims, 2 Drawing Sheets

100

(51) Int. Cl.
*H01M 4/38* (2006.01)
*H01M 4/587* (2010.01)
*H01M 10/0525* (2010.01)

(52) U.S. Cl.
CPC ....... *H01M 4/587* (2013.01); *H01M 10/0525* (2013.01); *H01M 2004/027* (2013.01)

(58) Field of Classification Search
CPC .. H01M 10/0525; H01M 4/364; H01M 4/625; H01M 4/131; H01M 4/136; H01M 4/483; H01M 4/58; H01M 10/052; H01M 4/13; H01M 4/583; H01M 4/621; H01M 4/624
See application file for complete search history.

(56) References Cited

U.S. PATENT DOCUMENTS

| | | | | |
|---|---|---|---|---|
| 2021/0257606 | A1* | 8/2021 | Kim | H01M 10/052 |
| 2021/0391570 | A1 | 12/2021 | Han et al. | |
| 2021/0408546 | A1 | 12/2021 | Kim et al. | |
| 2022/0123289 | A1 | 4/2022 | Bae et al. | |
| 2022/0209217 | A1 | 6/2022 | Lee et al. | |
| 2022/0416245 | A1* | 12/2022 | Mizukoshi | H01M 4/483 |
| 2023/0123455 | A1* | 4/2023 | Hu | H01M 4/364 429/231.95 |
| 2023/0207823 | A1* | 6/2023 | Wang | H01M 4/134 429/212 |

FOREIGN PATENT DOCUMENTS

| | | | |
|---|---|---|---|
| KR | 10-2020-0124513 | A | 11/2020 |
| KR | 10-2022-0028505 | A | 3/2022 |

* cited by examiner

ANODE FOR SECONDARY BATTERY AND LITHIUM SECONDARY BATTERY INCLUDING THE SAME

CROSS-REFERENCE TO RELATED APPLICATION(S)

This patent document claims the priority and benefits of Korean Patent Application No. 10-2022-0102486 filed on Aug. 17, 2022, the disclosure of which is incorporated herein by reference in its entirety.

TECHNICAL FIELD

The technology and implementations disclosed in this patent document generally relate to an anode for a secondary battery and a lithium-ion secondary battery including the same, and more particularly, to a high-capacity multilayer anode for a secondary battery having excellent quick charge characteristics, and a lithium-ion secondary battery including the same.

BACKGROUND

Recently, a large amount of research has been conducted on electric vehicles (EVs) capable of replacing vehicles using fossil fuels, such as gasoline vehicles, or diesel vehicles, one of the main causes of air pollution, and lithium-ion secondary batteries having high discharge voltage and output stability have been mainly used as power sources for such EVs. Accordingly, there has been an increasing need for lithium-ion secondary battery having with high energy density, and the development and research of high-capacity anodes for such batteries have also been actively conducted.

In order to implement secondary batteries having high capacity and high energy density, the application of silicon-based active materials, having high discharge capacity compared to graphite, to anodes for secondary batteries has been actively developed. When silicon-based active materials having high discharge capacity are applied in combination with carbon-based active materials such as graphite, a loading weight (LW) of the anode active layer may also be reduced, thereby further increasing energy density.

However, silicon-based active materials have a low lithium-ion diffusion rate and high-volume expansion rate compared to carbon-based active materials, such that an anode including a silicon-based active material may not easily secure excellent-level quick charge characteristics and lifespan characteristics. Accordingly, there is a demand for the development of an anode for a secondary battery having excellent capacity characteristics, quick charge characteristics, and lifespan characteristics.

SUMMARY

The disclosed technology can be implemented in some embodiments to provide a multilayer anode for a secondary battery, including carbon-based actives material having different characteristics for each layer and thereby having excellent quick charge characteristics and energy density, and a lithium-ion secondary battery including the same.

The disclosed technology can be implemented in some embodiments to provide a multilayer anode for a secondary battery, including a composition of an electrode mixture layer differently adjusted for each layer and thereby having excellent capacity characteristics and resistance characteristics, and a lithium-ion secondary battery including the same.

In some embodiments of the disclosed technology, an anode for a secondary battery, the anode includes a current collector, a first anode mixture layer formed on at least one surface of the current collector, and a second anode mixture layer formed on the first anode mixture layer. The first anode mixture layer and the second anode mixture layer include a silicon-based active material, respectively. The first anode mixture layer includes a first carbon-based active material. The second anode mixture layer includes a second carbon-based active material. The first carbon-based active material has an OI value according to Equation 1, greater than or equal to an OI value of the second carbon-based active material.

$$OI = I_{004}/I_{110} \quad \text{[Equation 1]}$$

In Equation 1, OI represents an orientation index according to an XRD measurement, $I_{004}$ represents a peak intensity of (004) plane when the XRD measurement is performed on a carbon-based active material, and $I_{110}$ represents a peak intensity of (110) plane when the XRD measurement is performed on the carbon-based active material.

The first carbon-based active material may have an OI value of 9 to 15. The second carbon-based active material may have an 01 value of 1 to 9.

A Raman R value may be represented by Equation 2 below. A Raman R value of the first carbon-based active material may be less than or equal to a Raman R value of the second carbon-based active material.

$$\text{Raman } R = I_D/I_G \quad \text{[Equation 2]}$$

In Equation 2, $I_D$ may represent a peak intensity value in an absorption region of 1350 to 1380 cm-1, and $I_G$ may represent a peak intensity value in an absorption region of 1580 to 1600 cm-1.

The first carbon-based active material may have a Raman R value of 0.20 to 0.27. The second carbon-based active material may have a Raman R value of 0.27 to 0.35.

A content of the silicon-based active material in the second anode mixture layer may be greater than or equal to a content of the silicon-based active material in the first anode mixture layer.

A content of the silicon-based active material in the first anode mixture layer may be 0.1 to 6 wt %.

A content of the silicon-based active material in the second anode mixture layer may be 8 to 20 wt %.

The first anode mixture layer may include a silicon oxide-based active material as the silicon-based active material.

The second anode mixture layer may include a silicon carbide-based active material as the silicon-based active material.

The first anode mixture layer may further include a first conductive material. The second anode mixture layer may further include a second conductive material.

The first conductive material and the second conductive material may be different from each other.

A Raman R value may be represented by Equation 2 below. A Raman R value of the first conductive material may be greater than or equal to a Raman R value of the second conductive material, and $$\text{Raman } R = I_D/I_G \quad \text{[Equation 2]}$$

In Equation 2, $I_D$ represents a peak intensity value in an absorption region of 1350 to 1380 $cm^{-1}$, and $I_G$ represents a peak intensity value in an absorption region of 1580 to 1600 $cm^{-1}$.

The Raman R value of the first conductive material may be 0.1 to 1.8. The Raman R value of the second conductive material may be 0.01 to 0.1.

A content of a first conductive material in the first anode mixture layer may be greater than or equal to a content of a second conductive material in the second anode mixture layer.

The content of the first conductive material in the first anode mixture layer may be 0.3 to 5 wt %. The content of the second conductive material in the second anode mixture layer may be 0.01 to 0.3 wt %.

The first anode mixture layer and the second anode mixture layer may further include a binder, respectively. A ratio between a content of the binder in the first anode mixture layer and a content of the binder in the second anode mixture layer may be 9:1 to 5:5.

A loading weight (LW) ratio between the first anode mixture layer and the second anode mixture layer may be 2:8 to 8:2.

In some embodiments of the disclosed technology, a lithium-ion secondary battery includes the above-described anode for a secondary battery.

According to some embodiments of the disclosed technology, there may be provided a multilayer anode for a secondary battery, including a silicon-based active material and thereby having excellent capacity characteristics, and including carbon-based active materials having different characteristics for each layer and thereby having excellent quick charge characteristics, and a lithium-ion secondary battery including the same.

According to some embodiments of the disclosed technology, there may be provided an anode for a secondary battery, including a composition of an electrode mixture layer appropriately adjusted for each layer and thereby having excellent capacity characteristics and resistance characteristics, and a lithium-ion secondary battery including the same.

BRIEF DESCRIPTION OF DRAWINGS

Certain aspects, features, and advantages of the disclosed technology are illustrated by the following detailed description with reference to the accompanying drawings.

DETAILED DESCRIPTION

Features of the disclosed technology disclosed in this patent document are described by embodiments with reference to the accompanying drawings.

The disclosed technology can be implemented in some embodiments to provide an anode for a secondary battery and a lithium-ion secondary battery including the same.

Hereinafter, preferred embodiments of the disclosed technology will be described. However, the embodiments of the disclosed technology can be modified in various forms, and the disclosed technology is not limited to the embodiments described below.

Herein, "orientation" of an active material may represent a character represented by a value of "orientation index (OI)" determined as a peak intensity ratio, a ratio between a peak intensity ($I_{004}$) of (004) plane and a peak intensity ($I_{110}$) of (110) plane according to an XRD measurement. For example, a relatively low OI value of the active material may represent a low-orientation active material with low orientation, and a relatively high OI value of the active material may represent a high-orientation active material with high orientation.

As described above, the silicon-based active material, included to increase the capacity of the anode for a secondary battery, may generally have a low lithium-ion diffusion rate compared to the carbon-based active material, and thereby may have relatively poor quick charge characteristics. In this regard, the inventors of the disclosed technology have confirmed that quick charge characteristics may be improved when a low-orientation carbon-based active material having a low OI value is included together with the silicon-based active material. However, there is practical difficulty in rolling the low-orientation carbon-based active material at high density, such that there is a limitation in securing energy density of the anode at a high level.

Accordingly, the inventors of the disclosed technology have confirmed that the above issues may be substantially solved when carbon-based active materials having different orientation characteristics for each layer are applied to an anode having a "multilayer structure." Referring to FIGS. 1 and 2, embodiments of the disclosed technology are described in detail below.

Figure 1:
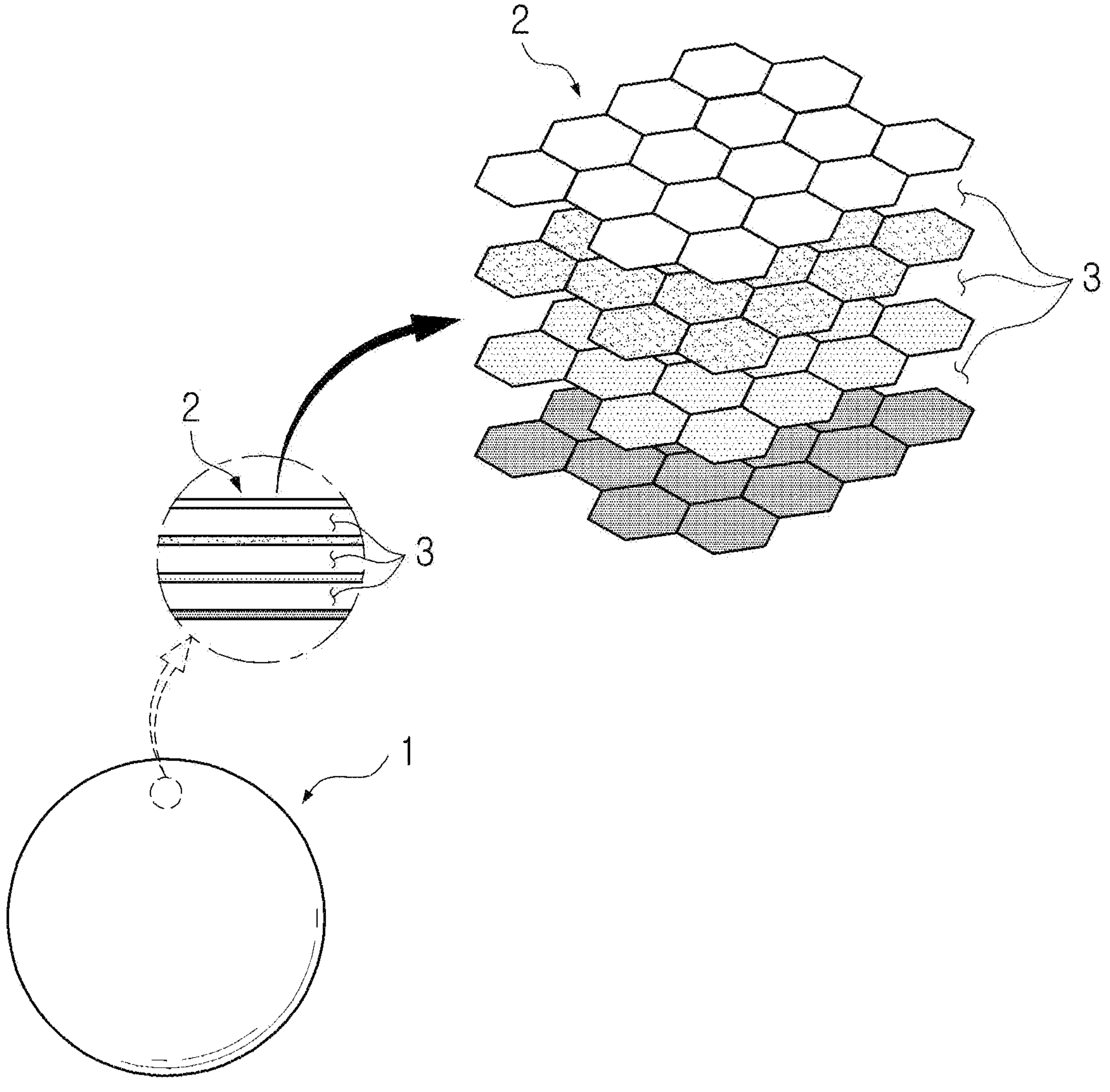
FIG. 1 is a schematic diagram illustrating a basal plane of carbon-based active material having a parallel stack structure, and an edge plane formed by gathering edges of the basal planes.

FIG. 1 is a schematic diagram illustrating a basal plane of carbon-based active material having a parallel stack structure, and an edge plane formed by gathering edges of the basal planes.

Figure 2:
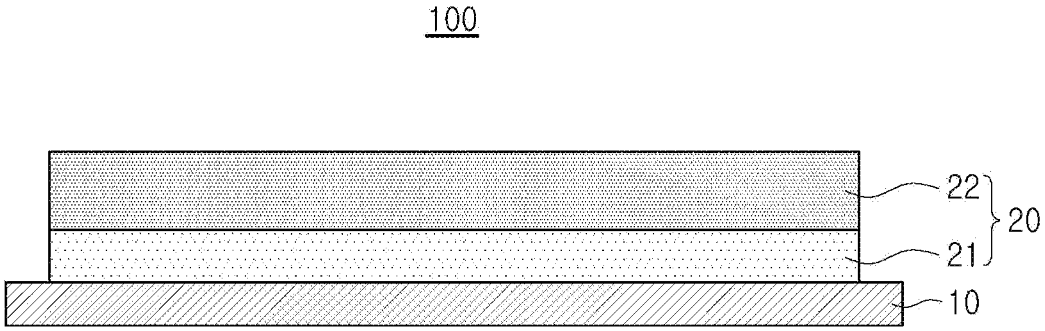
FIG. 2 is a schematic cross-sectional view of a structure of an anode for a secondary battery according to an embodiment of the disclosed technology.

FIG. 2 is a schematic cross-sectional view of a structure of an anode for a secondary battery according to an embodiment of the disclosed technology.

Anode for Secondary Battery 100

An anode 100 for a secondary battery according to an embodiment of the disclosed technology includes a current collector 10, a first anode mixture layer 21 formed on at least one surface of the current collector, and a second anode mixture layer 22 formed on the first anode mixture layer. The first anode mixture layer and the second anode mixture layer respectively include a silicon-based active material. The first anode mixture layer includes a first carbon-based active material. The second anode mixture layer includes a second carbon-based active material. The first carbon-based active material has an OI value according to Equation 1 below, greater than or equal to an OI value of the second carbon-based active material.

$$OI = I_{004}/I_{110} \quad \text{[Equation 1]}$$

In Equation 1, OI represents an orientation index according to an XRD measurement, $I_{004}$ represents a peak intensity of (004) plane when the XRD measurement is performed on a carbon-based active material, and $I_{110}$ represents a peak intensity of (110) plane when the XRD measurement is performed on the carbon-based active material.

The anode 100 for a secondary battery, having a multilayer structure, may include an anode mixture layer 20 on a current collector 10, and the anode mixture layer may include a first anode mixture layer 21 and a second anode mixture layer 22. The first anode mixture layer 21 may be an active material layer (lower layer) on one surface adjacent to the current collector, and the second anode mixture layer 22 may be an active material layer (upper layer) formed on the first anode mixture layer, relatively spaced apart from the current collector, and adjacent to an electrolyte.

In the anode 100 for a secondary battery according to an embodiment of the disclosed technology, the first anode mixture layer (lower layer) and the second anode mixture layer (upper layer) may respectively include a first carbon-based active material and a second carbon-based active material, carbon-based active materials having different orientations. Specifically, the first anode mixture layer, a lower layer, may include a high-orientation first carbon-based active material having a relatively high OI value, and the second anode mixture layer, an upper layer, may include a low-orientation second carbon-based active material with a relatively low OI value. Hereinafter, an OI of the carbon-based active material will be described in more detail.

The orientation index (OI), a ratio between a peak intensity ($I_{004}$) appearing on (004) plane and a peak intensity ($I_{110}$) appearing on (110) plane when an XRD measurement is performed on an active material, represents an 01 value. Specifically, $I_{004}$ may be a peak intensity value of the (004) plane appearing at an angle of $2\theta=54.7\pm0.2°$ when the XRD measurement is performed on the active material using CuKα rays, and $I_{110}$ may be a peak intensity value of the (110) plane appearing at an angle of $2\theta=77.5\pm0.2°$ when the XRD measurement is performed on the active material using CuKα rays. In general, a peak intensity value may represent a height value of a peak or an integral area value of the peak, and $I_{004}$ and $I_{110}$ may be calculated as the integral area value of the peak.

Referring to FIG. 1, a carbon-based active material 1 such as artificial graphite may generally include carbon layers in which hexagonal rings formed of six carbon atoms are planarly connected, and the carbon layers may be stacked to be parallel to each other. In the carbon-based active material, a basal plane 2 may correspond to a basal plane of a carbon layer having a parallel stack structure, and an edge plane 3 may represent a plane formed by gathering edges of the basal planes.

Intercalation and deintercalation, in which lithium-ions are stored in and discharged from a carbon-based active material during a process of charging/discharging a secondary battery, are mainly performed through the edge plane 3. Accordingly, as the number of edge planes 3 increases, intercalation and deintercalation of lithium-ions may become easier during a charging process, and quick charge characteristics may also be improved.

In this regard, an OI value, determined according to an XRD measurement performed on a carbon-based active material, represents a peak intensity of (110) plane compared to (004) plane. As the OI value of the carbon-based active material decreases, the number of edge planes 3 compared to the base plane 2 may be relatively increased. This may be determined to be due to an increase in the number of edge planes 3 through which lithium-ions enter and exit due to an increase in disorder of a crystal arrangement as the OI value decreases. Accordingly, when a carbon-based active material included in an anode is a low-orientation carbon-based active material having a low OI value, lithium-ions may easily enter and exit through many edge planes 3, such that quick charge characteristics may be excellent.

However, hardness of a carbon-based active material may increase as orientation decreases, such that it may be substantially difficult to roll a low-orientation carbon-based active material at high density. Accordingly, it may be difficult to increase rolling density of an anode including the low-orientation carbon-based active material, and there may be a limitation in preparing an anode for a secondary battery having high energy density.

Accordingly, the anode 100 for a secondary battery according to an embodiment of the disclosed technology, having a multilayer structure, may include carbon-based active materials having different orientations for each layer and thereby may have excellent quick charge characteristics and energy density. Specifically, the first anode mixture layer 21 may include a first carbon-based active material. The second anode mixture layer 22 may include a second carbon-based active material. The first carbon-based active material may have an OI value greater than or equal to an OI value of the second carbon-based active material.

That is, in the anode for a secondary battery, the first anode mixture layer 21, a lower layer, may include a high-orientation first carbon-based active material having a relatively high OI value, such that the first anode mixture layer 21 may be rolled to a high density, and thereby contributing to securing high energy density. In addition, the second anode mixture layer 22, an upper layer, may include a low-orientation second carbon-based active material having a relatively low OI value, such that lithium-ions may easily enter and exit an anode mixture layer adjacent to the electrolyte in which lithium-ions are present in large quantities, thereby contributing to securing excellent quick charge characteristics.

The first carbon-based active material of the anode for a secondary battery may have an OI value of 9 to 15, and the second carbon-based active material of the anode for a secondary battery may have an OI value of 1 to 9. Specifically, the first carbon-based active material of the anode for a secondary battery may have an OI value of 12 to 14, and the second carbon-based active material of the anode for a secondary battery may have an OI value of 3 to 5.

When the OI values of the first carbon-based active material and the second carbon-based active material are within the above-described ranges, orientation and hardness of a carbon-based active material included in each electrode mixture layer of the multilayer anode may be appropriately adjusted within different ranges, such that the anode may have excellent quick charge characteristics and energy density.

A Raman R value may be represented by Equation 2 below.

$$\text{Raman } R = I_D/I_G \quad \text{[Equation 2]}$$

In Equation 2, $I_D$ may represent a peak intensity value in an absorption region of 1350 to 1380 $cm^{-1}$, and $I_G$ may represent a peak intensity value in an absorption region of 1580 to 1600 $cm^{-1}$.

The Raman R value may be a parameter representing relative crystallinity of a material. A value of $I_D$ may represent a peak intensity of a region associated with an amorphous state, and a value of $I_G$ may represent a peak intensity of a region associated with a crystalline state. Accordingly, a higher Raman R value may represent a material having relatively low crystallinity, and a lower Raman R value may represent a material having relatively high crystallinity.

A Raman R value of the first carbon-based active material may be less than or equal to a Raman R value of the second carbon-based active material. Specifically, the Raman R value of the first carbon-based active material may be 0.20 to 0.27, and the Raman R value of the second carbon-based active material may be 0.27 to 0.35.

When the Raman R values of the first carbon-based active material and the second carbon-based active material are adjusted within the above-described ranges, a lower layer of the multilayer anode may include a high-density carbon-based active material having relatively high crystallinity and low porosity and thereby may have improved energy density, and an upper layer of the multilayer anode may include a low-density energy carbon-based active material having low crystallinity and high porosity to facilitate the entry and exit of lithium-ions and thereby may have improved quick charge characteristics.

The first carbon-based active material and the second carbon-based active material, satisfying the above-described OI values, are not particularly limited. For example, the first carbon-based active material and the second carbon-based active material may be one or more carbon-based active materials selected from among artificial graphite, natural graphite, hard carbon, soft carbon, carbon black, acetylene black, Ketjen black, super P, graphene, and fibrous carbon. Specifically, considering ease of controlling orientation of an active material, the first carbon-based active material and the second carbon-based active material may respectively include artificial graphite.

A content of the first carbon-based active material in the first anode mixture layer may be 90 to 95 wt %. In addition, a content of the second carbon-based active material in the second anode mixture layer may be 80 to 90 wt %.

A content of a silicon-based active material in the second anode mixture layer may be greater than or equal to a content of a silicon-based active material in the first anode mixture layer. When the silicon-based active material, included in the second anode mixture layer (upper layer) adjacent to an electrolyte in which lithium-ions are present in large quantities, has a relatively high content, the silicon-based active material, having a relatively low lithium-ion diffusion rate, may face a large quantity of lithium-ions to facilitate the entry and exit of ions. Accordingly, capacity characteristics may be further improved by increasing the content of the silicon-based active material with respect to the entire anode for a secondary battery while maintaining the quick charge characteristics of the anode at an excellent level.

A ratio between the content of the silicon-based active material in the first anode mixture layer and the content of the silicon-based active material in the second anode mixture layer may be 1:99 to 49:51. Specifically, the ratio between the content of the silicon-based active material in the first anode mixture layer and the content of the silicon-based active material in the second anode mixture layer may be 5:95 to 20:80, and 10:90 to 15:85.

The content of the silicon-based active material in the first anode mixture layer may be 0.1 to 6 wt %. The content of the silicon-based active material in the second anode mixture layer may be 8 to 20 wt %. Specifically, the content of the silicon-based active material in the first anode mixture layer may be 1 to 4 wt, and the content of the silicon-based active material in the second anode mixture layer may be 10 to 15 wt %.

When contents of the silicon-based active materials and a ratio between the silicon-based active materials in the first anode mixture layer and the second anode mixture layer are within the above-described ranges, a content of the silicon-based active material of the first anode mixture layer (lower layer) formed on one surface adjacent to a current collector may be adjusted to be relatively low, thereby alleviating an issue such as deintercalation of an active material layer due to volume expansion and improving lifespan characteristics. In addition, a content of the silicon-based active material, having a low lithium-ion diffusion rate compared to a carbon-based active material, in the second anode mixture layer (upper layer) may be adjusted to be relatively high, thereby securing high-capacity characteristics and quick charge characteristics of an electrode.

The silicon-based active material included in each of the first anode mixture layer and the second anode mixture layer is not particularly limited. However, depending on the purpose of designing a multilayer anode, the silicon-based active material may be appropriately selected from a silicon oxide-based active material, a compound represented by the chemical formula of $SiO_x$ ($0<x<2$), a silicon carbide-based active material such as a Si—C composite, a compound represented by the chemical formula of SiC, and a combination thereof.

In general, the Si—C composite may have high capacity and low resistance characteristics compared to a silicon oxide-based active material according to the related art. However, a short-circuit (isolation) may occur between the Si—C composite and a carbon-based active material due to structural collapse of an active material during a charging/discharging process. Accordingly, when a silicon oxide-based active material, having relatively less structural collapse during a charging/discharging process, is applied to a first anode mixture layer (lower layer) formed on one surface adjacent to a current collector, an issue such as a short-circuit (isolation) between the carbon-based active material and the silicon oxide-based active material may be alleviated, unlike a case in which the Si—C composite is applied. In addition, the Si—C composite, having relatively high capacity and low resistance characteristics, may be applied to a second anode mixture layer (upper layer), thereby securing high energy density at the same time. That is, the first anode mixture layer may include a silicon oxide-based active material as a silicon-based active material, and the second anode mixture layer may include a silicon carbide-based active material as a silicon-based active material.

The first anode mixture layer may further include a first conductive material, and the second anode mixture layer may further include a second conductive material. The first conductive material and the second conductive material may be used to impart conductivity to an electrode and to maintain a structure of the electrode. Any conductive material, not causing a side reaction with other elements of a secondary battery, may be used. For example, graphite such as natural graphite, or artificial graphite, a carbon-based active material such as carbon black, acetylene black, Ketjen black, channel black, furnace black, lamp black, summer black, or a carbon fiber, a metal powder or metal fiber such as copper, nickel, aluminum, or silver, a conductive whisker such as zinc oxide or potassium titanate, a conductive metal oxide such as titanium oxide, or a conductive polymer such as a polyphenylene derivative may be used, and only one thereof or a mixture of two or more thereof may be used. Specifically, the first conductive material and the second conductive material may include a carbon nanotube CNT, respectively. The carbon nanotube CNT may have high electron mobility compared to carbon black, a conductive material according to the related art, to enable high energy density to be realized with a small amount of material, may have high intensity due to a stable structure thereof, and may substantially alleviate volume expansion of a silicon-based active material. Accordingly, when the first conductive material and the second conductive material include the carbon nanotube CNT, energy density, lifespan characteristics, and resistance characteristics of the electrode may be more excellent.

The first conductive material and the second conductive material may be different from each other. Specifically, the anode 100 for a secondary battery may apply conductive materials having different characteristics to each layer in a multilayer anode for a secondary battery, respectively. In this regard, the characteristics of the first conductive material and the second conductive material may be adjusted as follows.

A Raman R value of the first conductive material may be greater than or equal to a Raman R value of the second conductive material. A detailed description of the Raman R value overlapping the above description will be omitted.

The Raman R value of the first conductive material may be 0.1 to 1.8, and the Raman R value of the second conductive material may be 0.01 to 0.1. Specifically, the Raman R value of the first conductive material may be 0.3 to 1.0, and the Raman R value of the second conductive material may be 0.01 to 0.05.

The first conductive material may include a multi-walled carbon nanotube MWCNT, and the second conductive material may include a single-walled carbon nanotube SWCNT.

When the Raman R values and types of the first conductive material and the second conductive material are applied as described above, a conductive material having relatively low crystallinity may be included in the first anode mixture layer (lower layer) adjacent to the current collector, thereby substantially alleviating an issue such as deintercalation due to volume expansion of the silicon-based active material. In addition, a conductive material, having high crystallinity and excellent conductivity and dispersibility, may be included in the second anode mixture layer (upper layer) having relatively low energy density to form and maintain a conductive path within an electrode layer, thereby further improving quick charge characteristics.

A content of the first conductive material in the first anode mixture layer may be greater than or equal to a content of the second conductive material in the second anode mixture layer. Specifically, the content of the first conductive material in the first anode mixture layer may be 0.3 to 5 wt %, and the content of the second conductive material in the second anode mixture layer may be 0.01 to 0.3 wt %. Specifically, the content of the first conductive material in the first anode mixture layer may be 0.3 to 3 wt, 0.35 to 1 wt, or 0.4 to 0.6 wt, and the content of the second conductive material in the second anode mixture layer may be 0.05 to 0.15 wt %.

When content characteristics of the first conductive material and the second conductive material are adjusted as described above, a content of a conductive material of a first anode mixture layer (lower layer) formed on one surface adjacent to a current collector may be adjusted to be relatively high, such that a contact point between the current collector and the first anode mixture layer may be increased. When the contact point is increased, resistance between an electrode and the current collector may be reduced. Even when the electrode is expanded during use, the contact point between the current collector and the electrode may be maintained. In addition, a content of a conductive material in a second anode mixture layer (upper layer) may be adjusted to be relatively low. Accordingly, a content of a conductive material included in the entire electrode may be reduced to secure economic feasibility, and a content of an active material in a mixture layer may be increased to implement an electrode having the same energy density with a relatively low loading weight. In addition, when an excessive amount of conductive material is included in the upper layer, a pore may be blocked, thereby alleviating an issue such as a reduction in interfacial resistance and lifespan characteristics of an electrode.

The first anode mixture layer and the second anode mixture layer may further include a binder, respectively.

The binder is not particularly limited as long as the binder is a compound serving to properly attach components in an anode mixture layer to each other and to properly attach the anode mixture layer to a current collector. For example, the binder may include at least one rubber-based binder selected from the group consisting of styrene-butadiene rubber (SBR), fluorine-based rubber, ethylene propylene rubber, butyl acrylate rubber, butadiene rubber, isoprene rubber, acrylonitrile rubber, acrylic rubber, and silane-based rubber, a cellulosic binder such as carboxymethylcellulose (CMC), hydroxypropylmethylcellulose, methylcellulose, or an alkali metal salt thereof, a water-soluble polymer-based binder such as a polyacrylic acid (PAA)-based binder, a polyvinyl alcohol (PVA)-based binder, and a polyvinyl alcohol-polyacrylic acid copolymer (PVA-PAA Copolymer)-based binder; and combinations thereof. Specifically, the binder may include styrene-butadiene rubber (SBR), carboxymethylcellulose (CMC), and a combination thereof.

A content of the binder in the first anode mixture layer may be greater than or equal to a content of the binder in the second anode mixture layer. Specifically, a ratio between the content of the binder in the first anode mixture layer and the content of the binder in the second anode mixture layer may be 9:1 to 5:5. More specifically, the ratio between the content of the binder in the first anode mixture layer and the content of the binder in the second anode mixture layer may be 8.5:1.5 to 7:3.

When the binder has an excessively low content, adhesive force of the first anode mixture layer adjacent to the current collector may be reduced, causing issues such as scrap generation in a notching process and deintercalation of a mixture layer. Conversely, when the binder having an excessively high content is included in the entire anode, electrical resistance may increase, resulting in a reduction in battery characteristics. Accordingly, when the content of the binder included in the first anode mixture layer, a lower layer, is adjusted to be relatively high, the above-described issues may be substantially alleviated while the content of the binder included in the entire anode may be reduced, thereby alleviating an increase in electrical resistance.

The content of the binder in the first anode mixture layer may be 2.0 to 5.0 wt %. In addition, the content of the binder in the second anode mixture layer may be 0.1 to 2.0 wt %. Specifically, the content of the binder in the first anode mixture layer may be 2.0 to 3.0 wt %, and the content of the binder in the second anode mixture layer may be 0.3 to 0.7 wt %.

When the content of the binder for each anode mixture layer is within the above-described ranges, a multilayer electrode may have excellent flexibility and adhesive force, thereby substantially alleviating issues such as electrode deintercalation in a process, and cracks or electrode deintercalation during a charging/discharging process, and securing low resistance characteristics.

A loading weight (LW) ratio between the first anode mixture layer and the second anode mixture layer may be 2:8 to 8:2. In addition, a loading weight of the first anode mixture layer may be 1.5 to 9.5 mg/$cm^2$, and a loading weight of the second anode mixture layer may be 1.5 to 9.5 mg/$cm^2$.

The loading weight (LW) may represent an amount of an anode mixture layer, that is, a layer including an active material, a binder, and a conductive material, formed on a current collector, expressed in units of weight per area. In this case, the area may be based on an area of the current collector, and the weight may be based on a weight of the entire anode mixture layer formed.

When the loading weight (LW) values of the first anode mixture layer and the second anode mixture layer and the loading weight (LW) ratio between of the first anode mixture layer and the second anode mixture layer are within the above-described ranges, a multilayer anode, having excellent capacity characteristics, lifespan characteristics, and quick charge characteristics, may be provided.

A material, selected from the group consisting of copper foil, nickel foil, stainless steel foil, titanium foil, nickel foam, copper foam, a conductive metal-coated polymer substrate, and combinations thereof, may be appropriately used for the current collector 10.

A method of preparing an anode for a secondary battery according to the disclosed technology is not particularly limited, and may be performed using a method such as (1) a "two-time coating" process of sequentially applying slurries of upper and lower layers, (2) a "simultaneous coating" process of simultaneously applying slurries of upper and lower layers. For example, the "two-time coating" process may be performed by applying, on a current collector, a first anode slurry including a first solvent, a first carbon-based active material, a silicon-based active material, a binder, and a first conductive material using bar coating, casting, or spraying and drying the first anode slurry at 70 to 100° C. to form a first anode mixture layer, and then applying, on the first anode mixture layer, a second anode slurry including a second solvent, a second carbon-based active material, a silicon-based active material, a binder, and a second conductive material using bar coating, casting, or spraying and drying the second anode slurry at 70 to 100° C.

The solvent may be, for example, dimethyl sulfoxide (DMSO), isopropyl alcohol, N-methylpyrrolidone (NMP), acetone, or water. An amount of the solvent used may be sufficient as long as the solvent dissolves or disperses an active material, a conductive material, and a binder in consideration of a thickness of a composition applied to form an anode mixture layer and a preparation yield, and has viscosity capable of exhibiting excellent thickness uniformity during a subsequent application process for forming an anode mixture layer.

Lithium-Ion Secondary Battery

A lithium-ion secondary battery according to an embodiment of the disclosed technology includes the anode for a secondary battery described above.

The lithium-ion secondary battery may include a cathode including a lithium-transition metal composite oxide. Specifically, the lithium-transition metal composite oxide may be an NCM-based cathode active material represented by the chemical formula of $Li_xNi_aCo_bMn_cO_y$ ($0<x\leq1.1$, $2\leq y\leq2.02$, $0<a<1$, $0<b<1$, $0<c<1$, $0<a+b+c\leq1$). In addition, the lithium-transition metal composite oxide may be a lithium-ion iron phosphate (LFP)-based cathode active material represented by the chemical formula $LiFePO_4$.

The lithium-ion secondary battery as described above may have excellent quick charge characteristics, high-capacity characteristics, lifespan characteristics, and resistance characteristics, and thus may be highly useful as a power source for electric vehicles (EVs).

Hereinafter, examples are provided to assist in understanding of the disclosed technology. However, the examples are merely illustrative of the disclosed technology and do not limit the scope of the appended claims. It will be apparent to those skilled in the art that various changes and modifications could be made to the examples within the scope and spirit of the disclosed technology, and are also within the scope of the appended claims.

Example and Comparative Example

1) Carbon-Based Active Material

A first active material and a second active material, which are artificial graphite for application as carbon-based active materials of Examples and Comparative Example, were respectively prepared, and the first active material and the second active material were applied differently, depending on the Examples and the Comparative Example, as the first carbon-based active material and the second carbon-based active material, respectively. Table 1 below shows the properties of the first active material and the second active material.

In this case, a peak intensity value for calculating an OI value of a carbon-based active material was measured using a CuKα ray as a target ray and using an XRD instrument (Empyrean made by PANalytical). In this case, a measurement was performed under conditions of 2θ=10° to 80°, scan speed (°/S)=3, and step size=0.025°/step.

In addition, a Raman R value of the carbon-based active material was calculated from the Raman spectrum measured using a Raman spectrometer (Invia made by RENISHAW). In this case, $I_D$ was based on a peak intensity value at 1360 $cm^{-1}$ of the spectrum measured at an excited wavelength of 532 nm using the Raman spectrometer, and $I_G$ was based on a peak intensity value at 1580 cm-1 of the spectrum measured at an excited wavelength of 532 nm using the Raman spectrometer. In addition, as measurement conditions, the number of scans was three and a laser exposure time was 30 seconds.

TABLE 1

| | Peak intensity of (004) plane ($I_{004}$) | Peak intensity of (110) plane ($I_{110}$) | Orientation Index (OI) ($I_{004}/I_{110}$) | Raman R value ($I_D/I_G$) |
|---|---|---|---|---|
| First active material | 16834 | 1295 | 13.00 | 0.25 |
| Second active material | 8609 | 1892 | 4.55 | 0.30 |

2) Preparation of Anode

A first anode slurry including a first carbon-based active material, a silicon-based active material, a binder, and a first conductive material, and a second anode slurry including a second carbon-based active material, a silicon-based active material, a binder, and a second conductive material were prepared, respectively. Thereafter, the first anode slurry was applied to a copper foil, a current collector, and dried at 80°

C. to form a first anode mixture layer, and the second anode slurry was applied on the first anode mixture layer and dried at 80° C. to form a second anode mixture layer, thereby preparing anodes for a secondary battery of the Examples and the Comparative Example. In this case, a loading weight (LW) ratio between the first anode mixture layer and the second anode mixture layer was applied as 5:5.

In this case, the first active material and the second active material, which are artificial graphite, were applied differently, depending on the Examples and the Comparative Example, as the first carbon-based active material and the second carbon-based active material, a single-walled carbon nanotube (SWCNT) having a Raman R value of 0.02 and a multi-walled carbon nanotube (MWCNT) having a Raman R value of 0.35 were applied differently, depending on the Examples and the Comparative Example, as the first conductive material and the second conductive material, and carboxymethylcellulose (CMC) and styrene-butadiene rubber (SBR) were applied as binders. In addition, a content of the first carbon-based active material in the first anode mixture layer was 94 wt %, a content of the second carbon-based active material in the second anode mixture layer was 86 wt %, contents of the silicon-based active material and the binder in the first anode mixture layer were 2 wt % and 2.5 wt %, respectively, and contents of the silicon-based active material and binder in the second anode mixture layer were 12 wt % and 0.5 wt %, respectively.

Table 2 below shows OIs of the first carbon-based active material and the second carbon-based active material, Raman R values of the first and second conductive materials, and contents of the first and second conductive materials, applied to anode mixture layers of the Examples and the Comparative Example.

In addition, a Raman R value of a conductive material was calculated from the Raman spectrum measured using a Raman spectrometer (Invia made by RENISHAW). In this case, $I_D$ was based on a peak intensity value at 1360 $cm^{-1}$ of the spectrum measured at an excited wavelength of 532 nm using the Raman spectrometer, and $I_G$ was based on a peak intensity value at 1580 cm-1 of the spectrum measured at an excited wavelength of 532 nm using the Raman spectrometer. In addition, as measurement conditions, the number of scans was three and a laser exposure time was 30 seconds.

TABLE 2

| | First anode mixture layer (lower layer) | | | Second anode mixture layer (upper layer) | | |
|---|---|---|---|---|---|---|
| | OI of first carbon-based active material ($I_{004}/I_{110}$) | First conductive material: Raman R value ($I_D/I_G$) | First conductive material: Content (wt %) | OI of second carbon-based active material ($I_{004}/I_{110}$) | Second conductive material: Raman R value ($I_D/I_G$) | Second conductive material: Content (wt %) |
| Example 1 | 13.00 | 0.35 | 0.5 | 4.55 | 0.02 | 0.1 |
| Example 2 | 13.00 | 0.35 | 0.5 | 13.00 | 0.02 | 0.1 |
| Example 3 | 4.55 | 0.35 | 0.5 | 4.55 | 0.02 | 0.1 |
| Example 4 | 13.00 | 0.35 | 0.5 | 4.55 | 0.35 | 0.1 |
| Example 5 | 13.00 | 0.02 | 0.5 | 4.55 | 0.35 | 0.1 |
| Comparative Example 1 | 4.55 | 0.35 | 0.5 | 13.00 | 0.02 | 0.1 |

3) Manufacturing of Secondary Battery

A cathode was prepared by applying and drying a slurry including an NCM-based active material, a Li-transition metal composite oxide, on an aluminum foil, and a secondary battery cell manufactured by interposing a polyolefin separator between the cathode and the anode prepared above was placed in a pouch for a secondary battery. Thereafter, a pouch-type lithium-ion secondary battery was manufactured by injecting an electrolyte in which 1 M of $LiPF_6$ was dissolved in a solvent containing a mixture of ethylene carbonate (EC) and diethyl carbonate (DEC) into the pouch for a secondary battery, and then sealing the pouch. The manufactured pouch-type lithium-ion secondary battery was applied as secondary battery samples of the Examples and the Comparative Example.

4) Evaluation of Energy Density

The manufactured secondary battery sample was used to manufacture a pouch-type secondary battery (cell) having a large capacity of 2θAh or more. Thereafter, the battery was charged with a constant current of 0.3 C until a voltage of 4.2V was reached, followed by charging with a constant voltage of 4.2 V (constant voltage mode) until a cutoff current of 0.05 C rate was reached. Thereafter, the battery was discharged with a constant current of 0.3 C until a voltage of 2.5V was reached. A discharge amount (Ah) and an energy (Wh) of the battery were measured and a volume of each battery was measured at a charge state of 4.2 V to calculate a volume-energy density, and results thereof are shown in Table 3 below.

5) Evaluation of Resistance Characteristics

The resistance characteristics of the secondary battery sample were measured by discharging the secondary battery sample with a current of 1 C for 10 seconds after a rest period of 1 hour at a state of charge (SOC) of 50% at 25° C., and results thereof are shown in Table 2. Specifically, a resistance value of the secondary battery sample was measured according to the following Equation 2, and results thereof are shown in Table 3.

$$R = (V_0 - V_1)/I \quad \text{[Equation 3]}$$

In Equation 3, R represents a resistance value of a secondary battery, $V_0$ represents a voltage of a secondary battery measured after a rest period of 1 hour at an SOC of 50% at 25° C., $V_1$ represents a voltage of a secondary battery measured after discharging the second battery with a current of 1 C for 10 seconds, and I represents a value of a current of 1 C.

6) Evaluation of Quick Charge Lifespan Characteristics

After repeating 300 cycles of charging the secondary battery sample at an SOC of 8 to 80% for 17 minutes and discharging the secondary battery sample with a current of 0.3 C at 25° C., a discharge capacity retention rate compared to an initial discharge capacity was measured as a percentage, and results thereof are shown in Table 3.

TABLE 3

| | Energy density (Wh/L) | Resistance characteristics (mΩ) | Quick charge lifespan characteristics (%) |
|---|---|---|---|
| Example 1 | 699 | 0.92 | 91.8 |
| Example 2 | 700 | 0.95 | 90.5 |
| Example 3 | 689 | 0.91 | 93.0 |
| Example 4 | 696 | 0.98 | 90.7 |
| Example 5 | 697 | 1.07 | 82.8 |
| Comparative Example 1 | 687 | 1.02 | 85.2 |

Referring to Tables 1 to 3 above, it was found that Comparative Example 1, in which a first anode mixture layer (lower layer) includes a relatively low-orientation carbon-based active material and a second anode mixture layer (upper layer) includes a relatively high-orientation carbon-based active material, had energy density, resistance characteristics, and quick charge lifespan characteristics relatively inferior to those of Examples 1 to 5. This may be determined to be due to increased voids in the first anode mixture layer (lower layer) including a low-orientation carbon-based active material, resulting in poor formation of a conductive path, and the second anode mixture layer (upper layer) including a high-orientation carbon-based active material, which is subjected to excessive pressure when an electrode is rolled to match energy density, resulting in difficulty in the entry and exit of lithium-ions.

Referring to Examples 1 to 5, Example 2, in which an upper second anode mixture layer in contact with an electrolyte does not include a low-orientation carbon-based active material, was found to have relatively insufficient resistance characteristics and quick charge characteristics as compared to Example 1, due to lithium-ions that did not relatively easily enter and exit in the upper layer. Example 3, in which both upper and lower anode mixture layers include a low-orientation anode active material, was found to have relatively excellent resistance characteristics and quick charge characteristics, and to have energy density relatively inferior to that of Example 1, due to increased voids in an electrode. Example 4, in which a small amount of material having poor conductivity is included in an upper second anode mixture layer, was found to have resistance characteristics and quick charge characteristics relatively inferior to those of Example 1. In addition, Example 5, in which a material having a relatively low Raman R value is included in a first anode mixture layer (lower layer) and a material having a relatively high Raman R value is included in a second anode mixture layer (upper layer), was also found to have resistance characteristics and quick charge lifespan characteristics relatively inferior to those of Examples 1 to 4. This may be determined to be due to a conductive material, having excellent dispersibility and conductivity, included in a first anode mixture layer (lower layer) adjacent to a current collector, resulting in reduced voids in an electrode, and a small amount of material having poor conductivity included in an upper second anode mixture layer (upper layer) in contact with an electrolyte.

Considering such results, it may be determined that when a lower first anode mixture layer appropriately includes a high-orientation carbon-based active material and a conductive material having excellent dispersibility, as in Example 1, and an upper second anode mixture layer appropriately includes a low-orientation carbon-based active material and a conductive material having excellent overall conductivity, as in Example 2, thereby providing an anode for a secondary battery having excellent energy density, resistance characteristics, and quick charge characteristics, and a lithium-ion secondary battery including the same.

Only specific examples of implementations of certain embodiments are described. Variations, improvements and enhancements of the disclosed embodiments and other embodiments may be made based on the disclosure of this patent document.

What is claimed is:

1. An anode for a secondary battery, the anode comprising:

a current collector;

a first anode mixture layer formed on at least one surface of the current collector; and a second anode mixture layer formed on the first anode mixture layer, wherein the first anode mixture layer and the second anode mixture layer include a silicon-based active material, respectively, the first anode mixture layer includes a first carbon-based active material, the second anode mixture layer includes a second carbon-based active material, the first carbon-based active material has an OI value according to Equation 1, greater than or equal to an OI value of the second carbon-based active material, and a content of the silicon-based active material in the second anode mixture layer is greater than a content of the silicon-based active material in the first anode mixture layer, $$OI = I_{004}/I_{110}, \quad \text{[Equation 1]}$$

in Equation 1, OI represents an orientation index according to an XRD measurement, $I_{004}$ represents a peak intensity of (004) plane when the XRD measurement is performed on a carbon-based active material, and $I_{110}$ represents a peak intensity of (110) plane when the XRD measurement is performed on the carbon-based active material.

2. The anode of claim 1, wherein the first carbon-based active material has an OI value of 9 to 15, and the second carbon-based active material has an OI value of 1 to 9.

3. The anode of claim 1, wherein a Raman R value is represented by Equation 2 below, a Raman R value of the first carbon-based active material is less than or equal to a Raman R value of the second carbon-based active material, and $$\text{Raman } R = I_D/I_G \quad \text{[Equation 2]}$$

In Equation 2, $I_D$ represents a peak intensity value in an absorption region of 1350 to 1380 $cm^{-1}$, and $I_G$ represents a peak intensity value in an absorption region of 1580 to 1600 $cm^{-1}$.

4. The anode of claim 1, wherein a content of the silicon-based active material in the first anode mixture layer is 0.1 to 6 wt %, and a content of the silicon-based active material in the second anode mixture layer is 8 to 20 wt %.

5. The anode of claim 1, wherein the first anode mixture layer includes a silicon oxide-based active material as the silicon-based active material, and the second anode mixture layer includes a silicon carbide-based active material as the silicon-based active material.

6. The anode of claim 1, wherein the first anode mixture layer further includes a first conductive material, the second anode mixture layer further includes a second conductive material, and the first conductive material and the second conductive material are different from each other.

7. The anode of claim 1, wherein the first anode mixture layer further includes a first conductive material, the second anode mixture layer further includes a second conductive material, and a content of the first conductive material in the first anode mixture layer is greater than or equal to a content of the second conductive material in the second anode mixture layer.

8. The anode of claim 7, wherein the content of the first conductive material in the first anode mixture layer is 0.3 to 5 wt %, and the content of the second conductive material in the second anode mixture layer is 0.01 to 0.3 wt %.

9. The anode of claim 1, wherein the first anode mixture layer and the second anode mixture layer further include a binder, respectively, and a ratio between a content of the binder in the first anode mixture layer and a content of the binder in the second anode mixture layer is 9:1 to 5:5.

10. The anode of claim 1, wherein a loading weight (LW) ratio between the first anode mixture layer and the second anode mixture layer is 2:8 to 8:2.

11. A lithium-ion secondary battery comprising:

an anode for a secondary battery of claim 1.

12. An anode for a secondary battery, the anode comprising:

a current collector;

a first anode mixture layer formed on at least one surface of the current collector; and a second anode mixture layer formed on the first anode mixture layer, wherein the first anode mixture layer and the second anode mixture layer include a silicon-based active material, respectively, the first anode mixture layer includes a first carbon-based active material, the second anode mixture layer includes a second carbon-based active material, the first carbon-based active material has an OI value according to Equation 1, greater than or equal to an OI value of the second carbon-based active material, and $$OI = I_{004}/I_{110}, \quad \text{[Equation 1]}$$

in Equation 1, OI represents an orientation index according to an XRD measurement, $I_{004}$ represents a peak intensity of (004) plane when the XRD measurement is performed on a carbon-based active material, and $I_{110}$ represents a peak intensity of (110) plane when the XRD measurement is performed on the carbon-based active material, wherein a Raman R value is represented by Equation 2 below, a Raman R value of the first carbon-based active material is less than or equal to a Raman R value of the second carbon-based active material, and $$\text{Raman } R = I_D/I_G, \quad \text{[Equation 2]}$$

in Equation 2, $I_D$ represents a peak intensity value in an absorption region of 1350 to 1380 $cm^{-1}$, and $I_G$ represents a peak intensity value in an absorption region of 1580 to 1600 $cm^{-1}$, and wherein the first carbon-based active material has a Raman R value of 0.20 to 0.27, and the second carbon-based active material has a Raman R value of 0.27 to 0.35.

13. An anode for a secondary battery, the anode comprising:

a current collector;

a first anode mixture layer formed on at least one surface of the current collector; and a second anode mixture layer formed on the first anode mixture layer, wherein the first anode mixture layer and the second anode mixture layer include a silicon-based active material, respectively, the first anode mixture layer includes a first carbon-based active material, the second anode mixture layer includes a second carbon-based active material, the first carbon-based active material has an OI value according to Equation 1, greater than or equal to an OI value of the second carbon-based active material, and $$OI = I_{004}/I_{110}, \quad \text{[Equation 1]}$$

in Equation 1, OI represents an orientation index according to an XRD measurement, $I_{004}$ represents a peak intensity of (004) plane when the XRD measurement is performed on a carbon-based active material, and $I_{110}$ represents a peak intensity of (110) plane when the XRD measurement is performed on the carbon-based active material, wherein the first anode mixture layer further includes a first conductive material, the second anode mixture layer further includes a second conductive material, and the first conductive material and the second conductive material are different from each other, and wherein a Raman R value is represented by Equation 2 below, a Raman R value of the first conductive material is greater than or equal to a Raman R value of the second conductive material, and $$\text{Raman } R = I_D/I_G, \qquad \text{[Equation 2]}$$

In in Equation 2, $I_D$ represents a peak intensity value in an absorption region of 1350 to 1380 $cm^{-1}$, and $I_G$ represents a peak intensity value in an absorption region of 1580 to 1600 $cm^{-1}$.

14. The anode of claim 13, wherein the Raman R value of the first conductive material is 0.1 to 1.8, and the Raman R value of the second conductive material is 0.01 to 0.1.

* * * * *